Patented Jan. 6, 1953

2,624,748

UNITED STATES PATENT OFFICE 2,624,748

BISNORCHOLA-4,6-DIEN-3-ONE-22-AL

Robert H. Levin and A Vern McIntosh, Jr., Kalamazoo, Mich., assignors to The Upjohn Company, Kalamazoo, Mich., a corporation of Michigan No Drawing. Application September 9, 1950,
Serial No. 184,113

1 Claim. (Cl. 260—397.3)

The present invention relates to a novel product, bisnorchola-4,6-dien-3-one-22-al, and to a process for the production thereof.

The compound of the present invention may be represented by the formula:

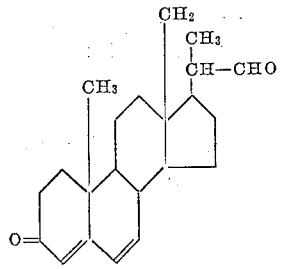

This compound is of exceptional utility as a chemical intermediate in the preparation of steroid hormones, providing a direct approach to progesterone, the androgens, and estrogens, starting from isoergosterone.

The process of the present invention involves the selective ozonization of isoergosterone, which may be represented by the formula:

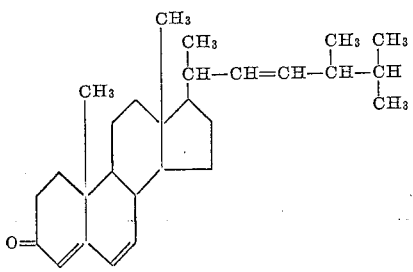

using from one to 1.25 moles of ozone per mole of starting isoergosterone, decomposing the ozonide thus produced, and isolating the desired bisnorchola-4,6-dien-3-one-22-al from the reaction product. The result of the present process, i. e., production of bisnorchola-4,6-dien-3-one-22-al, is unexpected as it was not believed that ozonization could be accomplished with such selectivity in the presence of such a highly unsaturated system as exists at carbon atoms 4, 6, and 22 of isoergosterone.

The process of the present invention involves dissolving the isoergosterone in a suitable solvent, cooling to about minus eighty degrees centigrade to plus thirty degrees centigrade, and passing ozone, ozonized air, or ozonized oxygen into the solution until about 1.0 to about 1.25 moles, preferably 1.0 to 1.1 moles, of ozone per mole of isoergosterone has been absorbed. The addition of ozone to the 22:23 double bond is so rapid that only a small amount of ozone escapes from the reaction mixture, and the amount of ozone ordinarily required therefore closely approximates the theoretical amount. Loss to the solvent, if any loss occurs, must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the isoergosterone with a bath of solid carbon dioxide in acetone or the like, although various other methods of cooling may be employed. Many of the customary solvents used in ozonizations such as chloroform, acetic acid, carbon tetrachloride, ethylene chloride, methylene chloride, and the like, can be used.

The ozonide is then decomposed under reductive conditions, that is, in the absence of oxidizing agents, whether added or formed in the course of the reaction by products of decomposition of the ozonide. This means that excess oxygen formed by decomposition of the ozonide is prevented from forming hydrogen peroxide by combining with any moisture present, and that molecular oxygen is prevented from oxidizing the aldehyde thus formed. This can be conveniently accomplished by decomposing the ozonide in glacial acetic acid by the addition of finely-powdered zinc, or by a catalytic amount of colloidal metal such as silver, platinum, or palladium in a solvent, such as glacial acetic acid, alcohol, or ethyl acetate. The use of "reductive conditions" is well established in the art [Hill and Kelly, "Organic Chemistry," page 53, The Blackiston Company, Philadelphia (1934); Church et al., J. Am. Chem. Soc. 56,176–184 (1934); Gilman "Organic Chemistry," Second Edition, page 636, John Wiley and Sons, New York (1943); Long, Chem. Reviews 27,452–454 (1940)].

As is conventional with ozonizations when conducted in solvents other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid, if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

The following example is given as illustrative only, and is not to be construed as limiting.

*Example.—Preparation of bisnorchola-4,6-dien-3-one-22-al*

A solution of 0.79 gram (2.0 millimoles) of isoergosterone in sixty milliliters of methylene chloride was cooled in a Dry Ice-acetone bath at a temperature of about minus 70 degrees centigrade, while ozonized oxygen containing 1.06 equivalents of ozone was passed into the solution. The reaction mixture was then warmed to room temperature, fifteen milliliters of glacial acetic acid added, and the solution concentrated in vacuo to about ten milliliters to remove the methylene chloride. Acetic acid was added to bring the volume to twenty milliliters, and 2.5 grams of zinc dust was added in portions over a twenty-minute period at a temperature of 25–31 degrees centigrade. The zinc was removed by filtration and the acetic acid solution poured into water, giving 0.59 gram of solid, which was dissolved in an ether-alcohol mixture and extracted with 36 percent aqueous sodium bisulfite. The bisulfite solution was decomposed with sodium carbonate and extracted with ether. Upon evaporation of the ether, about two hundred milligrams of a gummy material, which analyzed for bisnorchola-4,6-dien-3-one-22-al, $C_{22}H_{30}O_2$, M. W. 326.46, remained. Infrared spectrum showed that aldehyde and conjugated ketone groups were present. Ultraviolet analyses showed an absorption maximum at 285 $M\mu$, and an extinction coefficient of 19,900, showing that the 3-keto-delta 4,6 grouping was still present. (For isoergosterone, the absorption maximum is 280 $M\mu$ and the extinction coefficient is 33,100 per Heilbron, J. Chem. Soc. 1938, 869.) The compound bisnorchola-4,6-dien-3-one-22-al after crystallization from dilute acetic acid has a melting point of about 120 degrees centigrade.

The dinitrophenylhydrazone, prepared from the crude aldehyde and 2,4-dinitrophenylhydrazine, after chromatography and crystallization, melts at 215–223 degrees centigrade.

The compound bisnorchola-4,6-dien-3-one-22-al is also useful as starting material in the preparation of bisnorcholen-3-one-22-al, having the formula:

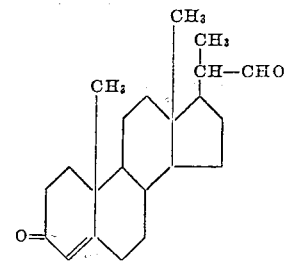

This compound is prepared from bisnorchola-4,6-dien-3-one-22-al by selective hydrogenation of the 6,7 double bond using mossy zinc and acetic acid or methanol, according to conventional procedure as is well known in the art.

It is to be understood that the invention is not to be limited to the exact details of operation or exact compounds shown and described, as obvious modifications and equivalents will be apparent to one skilled in the art, and the invention is therefore to be limited only by the scope of the appended claim.

We claim:

The compound bisnorchola-4,6-dien-3-one-22-al, represented by the formula:

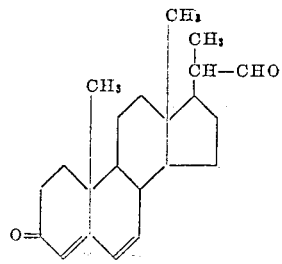

ROBERT H. LEVIN.
A VERN McINTOSH, Jr.

REFERENCES CITED

The following references are of record in the file of this patent:

UNITED STATES PATENTS

| Number | Name | Date |
|---|---|---|
| 2,296,284 | Julian et al. | Sept. 22, 1942 |
| 2,321,690 | Logemann | June 15, 1943 |

OTHER REFERENCES

Heyl: Jour. Am. Chem. Soc., 69, 1957–1961 (1947).

Bergmann: Jour. Org. Chem. 13, 10–20 (1948).